(12) United States Patent
Birajdar et al.

(10) Patent No.: US 12,545,127 B2
(45) Date of Patent: Feb. 10, 2026

(54) HIGH VOLTAGE BATTERY ENCLOSURE FOR VEHICLE

(71) Applicant: Karma Automotive LLC, Irvine, CA (US)

(72) Inventors: Vyankatesh Birajdar, Irvine, CA (US); Shripad Vijapure, Irvine, CA (US); Sandip Jadhav, Irvine, CA (US)

( * ) Notice: Subject to any disclaimer, the term of this patent is extended or adjusted under 35 U.S.C. 154(b) by 490 days.

(21) Appl. No.: 18/301,749

(22) Filed: Apr. 17, 2023

(65) Prior Publication Data

US 2024/0343129 A1    Oct. 17, 2024

(51) Int. Cl.
*B60L 50/60* (2019.01)
*B60K 1/04* (2019.01)

(52) U.S. Cl.
CPC .............. *B60L 50/66* (2019.02); *B60K 1/04* (2013.01); *B60K 2001/0438* (2013.01)

(58) Field of Classification Search
CPC .......... B60L 50/64; B60L 50/66; B60L 50/70; B60L 50/71; B60L 50/72; B60K 2001/0438
See application file for complete search history.

(56) References Cited

U.S. PATENT DOCUMENTS

| | | | |
|---|---|---|---|
| 6,085,854 A | 7/2000 | Nishikawa | |
| 8,833,839 B2 * | 9/2014 | Young | B62D 25/025 296/187.08 |
| 9,755,202 B2 | 9/2017 | Sham | |
| 10,020,547 B2 | 7/2018 | Eom et al. | |
| 10,099,546 B2 | 10/2018 | Hara et al. | |
| 10,259,506 B2 * | 4/2019 | Ayukawa | B62D 25/025 |
| 10,308,132 B2 | 6/2019 | Milton et al. | |
| 10,483,510 B2 * | 11/2019 | Stephens | H01M 50/249 |
| 10,576,836 B2 * | 3/2020 | Ruech | B60K 1/04 |
| 10,603,998 B2 | 3/2020 | Toyota | B60L 50/66 |
| 10,618,564 B2 * | 4/2020 | Kellner | B62D 21/157 |
| 10,632,857 B2 * | 4/2020 | Matecki | B60L 50/64 |
| 10,633,029 B1 * | 4/2020 | Nusier | B62D 25/025 |
| 10,710,638 B2 * | 7/2020 | Kawase | B60K 1/04 |
| 10,752,292 B2 * | 8/2020 | Kawase | B62D 21/157 |
| 10,763,474 B1 * | 9/2020 | Yin | H01M 50/244 |
| 10,766,537 B2 * | 9/2020 | Kawase | B62D 25/025 |

(Continued)

OTHER PUBLICATIONS

International Search Report (European Patent Office) and Written Opinion for Application PCT/US2024/024580 dated Jul. 17, 2024.

*Primary Examiner* — Jeffrey J Restifo
(74) *Attorney, Agent, or Firm* — Honigman LLP; Grant Griffith; Thomas Appledorn

(57) ABSTRACT

A modular battery pack for a vehicle includes a scalable enclosure structure that includes a front enclosure rail, a rear enclosure rail, and a pair of rocker attachment rails extending between the front and rear enclosure rails along opposing sides of the enclosure structure. Each of the rocker attachment rails includes a length that is scalable to adjust a length of the battery pack. A bottom cover panel is coupled to respective first sides of the front enclosure rail, the rear enclosure rail, and each of the rocker attachment rails. A top cover panel is coupled to respective second sides of the front enclosure rail, the rear enclosure rail, and each of the rocker attachment rails. A battery module is supported on the scalable enclosure structure between the bottom cover panel and the top cover panel.

31 Claims, 6 Drawing Sheets

(56) References Cited

U.S. PATENT DOCUMENTS

| | | | |
|---|---|---|---|
| 10,766,540 B2* | 9/2020 | Sono | B62D 25/025 |
| 10,780,767 B2 | 9/2020 | Rawlinson et al. | |
| 10,790,544 B1 | 9/2020 | Wang et al. | |
| 10,894,469 B2* | 1/2021 | Page | B62D 21/02 |
| 10,971,770 B2 | 4/2021 | Seo et al. | |
| 11,214,137 B2* | 1/2022 | Stephens | B60L 50/66 |
| 12,347,879 B2* | 7/2025 | Matecki | H01M 50/249 |
| 2010/0307848 A1 | 12/2010 | Hashimoto et al. | |
| 2012/0223113 A1* | 9/2012 | Gaisne | H01M 50/249 |
| | | | 224/538 |
| 2013/0270864 A1* | 10/2013 | Young | B60K 1/04 |
| | | | 296/187.12 |
| 2018/0186227 A1 | 7/2018 | Stephens et al. | |
| 2020/0148066 A1 | 5/2020 | Sekar et al. | |
| 2020/0156486 A1 | 5/2020 | Howard et al. | |
| 2021/0091352 A1 | 3/2021 | Weicker et al. | |
| 2021/0104801 A1 | 4/2021 | Chu et al. | |
| 2022/0126705 A1 | 4/2022 | He et al. | |
| 2024/0343102 A1* | 10/2024 | Birajdar | B60K 1/04 |
| 2024/0343129 A1* | 10/2024 | Birajdar | H01M 50/258 |

\* cited by examiner

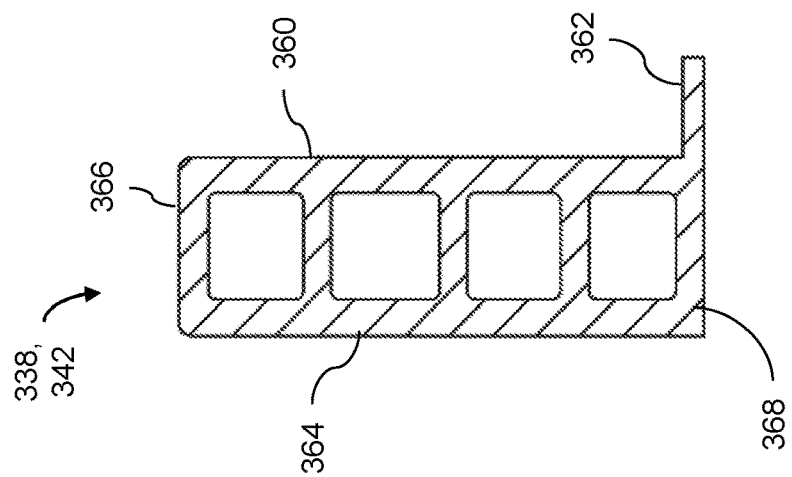
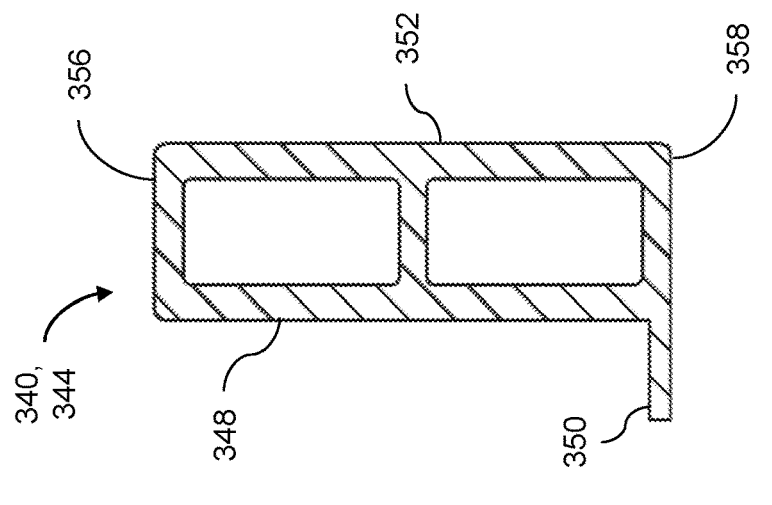
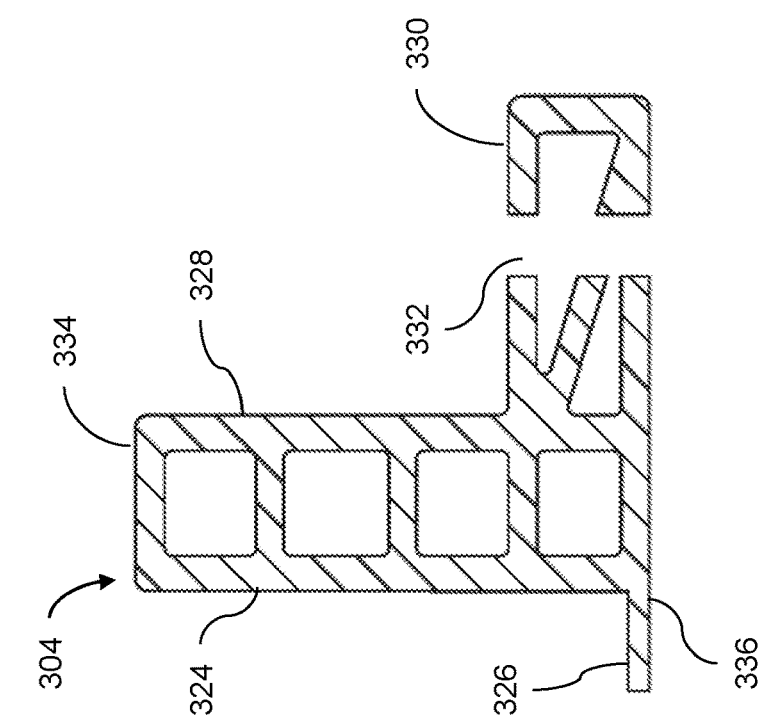

HIGH VOLTAGE BATTERY ENCLOSURE FOR VEHICLE

TECHNICAL FIELD

This disclosure relates to modular battery enclosures for electric vehicles.

BACKGROUND

It is known to provide a vehicle structural frame that supports a drivetrain, one or more vehicle batteries for electrically powering the drivetrain, and a vehicle body providing a cabin to accommodate occupants of the vehicle. However, vehicles in different segments (e.g., coupes, sedans, SUVs, and the like) typically require distinct frames that are designed and manufactured with diverse components and constructions configured for the particular product line. Further, frame structures commonly have different dimensions and configurations to accommodate characteristic differences between the different vehicle segments (e.g., different wheelbases, different wheel tracks, different ground clearances, and the like). Thus, the batteries of vehicles in different segments often have unique configurations, which leads to expensive and time-consuming product development and manufacturing processes that can result in high waste and increased business risk.

SUMMARY

One aspect of the disclosure provides a modular battery pack for a vehicle. The modular battery pack includes a scalable enclosure structure that includes a front enclosure rail, a rear enclosure rail, and a pair of rocker attachment rails extending between the front enclosure rail and the rear enclosure rail along opposing sides of the enclosure structure. Each rail in the pair of rocker attachment rails includes a length that is scalable to adjust a length of the modular battery pack. A bottom cover panel is coupled to respective first sides of the front enclosure rail, the rear enclosure rail, and each rail of the pair of rocker attachment rails. A top cover panel is coupled to respective second sides of the front enclosure rail, the rear enclosure rail, and each rail of the pair of rocker attachment rails. The respective second sides of the front enclosure rail, the rear enclosure rail, and each rail of the pair of rocker attachment rails are opposite the respective first sides. A battery module is supported on the scalable enclosure structure between the bottom cover panel and the top cover panel.

Implementations of the disclosure may include one or more of the following optional features. In some implementations, each rail of the pair of rocker attachment rails includes an extruded rail. The extruded rail is trimmed to one of a first length to adjust the length of the modular battery pack to a first length or to a second length that is less than the first length to adjust the length of the modular battery pack to a second length that is less than the first length of the modular battery pack. Optionally, the length of the pair of rocker attachment rails is scaled to adjust the length of the modular battery pack based on a length of a battery receiving portion of a frame structure of the vehicle.

In some examples, the front enclosure rail and the rear enclosure rail are scalable to adjust a width of the modular battery pack. In further examples, each of the front enclosure rail and the rear enclosure rail respectively includes a first corner rail coupled to a first rail of the pair of rocker attachment rails, a second corner rail coupled to a second rail of the pair of rocker attachment rails, and a cross-member extending between the first corner rail and the second corner rail. A length of the cross-member is scalable to adjust the width of the modular battery pack. In even further examples, the cross-member includes an extruded rail and the extruded rail is trimmed to one of a first length to adjust the width of the modular battery pack to a first width, or a second length that is less than the first length to adjust the width of the modular battery pack to a second width that is less than the first width. In other even further examples, each of the first corner rail and the second corner rail of the front enclosure rail includes an extruded front corner rail formed from a common die and each of the first corner rail and the second corner rail of the rear enclosure rail includes an extruded rear corner rail formed from a common die. In additional even further examples, each of the first corner rail and the second corner rail of the front enclosure rail and the first corner rail and the second corner rail of the rear enclosure rail includes an extruded corner rail formed from a common die. Optionally, a length of the front enclosure rail and the rear enclosure rail is scaled to adjust the width of the modular battery pack based on a width of a battery receiving portion of a frame structure of the vehicle.

In some implementations, the scalable enclosure structure includes a cross-member that extends between the pair of rocker attachment rails at a position along the pair of rocker attachment rails that is between the front enclosure rail and the rear enclosure rail. The battery module is supported on the cross-member.

In some examples, the scalable enclosure structure includes a plurality of cross-members that respectively extend between the pair of rocker attachment rails at discrete positions along the pair of rocker attachment rails between the front enclosure rail and the rear enclosure rail. The battery module is supported between adjacent cross-members of the plurality of cross-members.

Optionally, the pair of rocker attachment rails, when the modular battery pack is supported on a frame structure of a vehicle, respectively mount to corresponding rocker rails extending along opposing sides of the frame structure of the vehicle. The battery module, when the modular battery pack is equipped at the vehicle, is operable to electrically power a drivetrain of the vehicle.

Another aspect of the disclosure provides a vehicle. The vehicle includes a frame structure including a pair of rocker rails extending along opposing sides of the frame structure. A modular battery pack is supported on the frame structure and is operable to electrically power a drivetrain of the vehicle. The modular battery pack includes a scalable enclosure structure that includes a front enclosure rail, a rear enclosure rail, and a pair of rocker attachment rails extending between the front enclosure rail and the rear enclosure rail along opposing sides of the enclosure structure. Each rail in the pair of rocker attachment rails includes a length that is scalable to adjust a length of the modular battery pack. A bottom cover panel is coupled to respective first sides of the front enclosure rail, the rear enclosure rail, and each rail of the pair of rocker attachment rails. A top cover panel is coupled to respective second sides of the front enclosure rail, the rear enclosure rail, and each rail of the pair of rocker attachment rails. The respective second sides of the front enclosure rail, the rear enclosure rail, and each rail of the pair of rocker attachment rails are opposite the respective first sides. The battery module is supported on the scalable enclosure structure between the bottom cover panel and the top cover panel.

Implementations of the disclosure may include one or more of the following optional features. In some implementations, each rail of the pair of rocker attachment rails includes an extruded rail. The extruded rail is trimmed to one of a first length to adjust the length of the modular battery pack to a first length or to a second length that is less than the first length to adjust the length of the modular battery pack to a second length that is less than the first length of the modular battery pack. Optionally, the length of the pair of rocker attachment rails is scaled to adjust the length of the modular battery pack based on a length of a battery receiving portion of the frame structure of the vehicle.

In some examples, the front enclosure rail and the rear enclosure rail are scalable to adjust a width of the modular battery pack. In further examples, each of the front enclosure rail and the rear enclosure rail respectively includes a first corner rail coupled to a first rail of the pair of rocker attachment rails, a second corner rail coupled to a second rail of the pair of rocker attachment rails, and a cross-member extending between the first corner rail and the second corner rail. A length of the cross-member is scalable to adjust the width of the modular battery pack. In even further examples, the cross-member includes an extruded rail and the extruded rail is trimmed to one of a first length to adjust the width of the modular battery pack to a first width, or a second length that is less than the first length to adjust the width of the modular battery pack to a second width that is less than the first width. In other even further examples, each of the first corner rail and the second corner rail of the front enclosure rail includes an extruded front corner rail formed from a common die and each of the first corner rail and the second corner rail of the rear enclosure rail includes an extruded rear corner rail formed from a common die. In additional even further examples, each of the first corner rail and the second corner rail of the front enclosure rail and the first corner rail and the second corner rail of the rear enclosure rail includes an extruded corner rail formed from a common die. Optionally, a length of the front enclosure rail and the rear enclosure rail is scaled to adjust the width of the modular battery pack based on a width of a battery receiving portion of the frame structure of the vehicle.

In some implementations, the scalable enclosure structure includes a cross-member that extends between the pair of rocker attachment rails at a position along the pair of rocker attachment rails that is between the front enclosure rail and the rear enclosure rail. The battery module is supported on the cross-member.

In some examples, the scalable enclosure structure includes a plurality of cross-members that respectively extend between the pair of rocker attachment rails at discrete positions along the pair of rocker attachment rails between the front enclosure rail and the rear enclosure rail. The battery module is supported between adjacent cross-members of the plurality of cross-members.

Optionally, the pair of rocker attachment rails, when the modular battery pack is supported on a frame structure of a vehicle, respectively mount to corresponding rocker rails extending along opposing sides of the frame structure of the vehicle.

Yet another aspect of the disclosure provides a method for manufacturing a modular battery pack for a vehicle. The method includes, to provide a scalable enclosure structure, mounting a front enclosure rail at respective first ends of a pair of extruded rails and mounting a rear enclosure rail at respective second ends of the pair of extruded rails that are opposite the respective first ends. Before mounting the front enclosure rail and the rear enclosure rail at the pair of extruded rails, the method includes trimming the pair of extruded rails to one of a first length to provide a first length of the modular battery pack or a second length that is less than the first length to provide a second length of the modular battery pack that is less than the first length of the modular battery pack. The method includes mounting a bottom cover panel to respective first sides of the front enclosure rail, the rear enclosure rail, and each rail of the pair of extruded rails. The method includes mounting a top cover panel to respective second sides of the front enclosure rail, the rear enclosure rail, and each rail of the pair of extruded rails. The respective second sides of the front enclosure rail, the rear enclosure rail, and each rail of the pair of extruded rail are opposite the respective first sides. The method includes supporting a battery module on the scalable enclosure structure between the bottom cover panel and the top cover panel.

Implementations of the disclosure may include one or more of the following optional features. In some implementations, the pair of extruded rails are trimmed to one of the first length or the second length based on a length of a battery receiving portion of a frame structure of the vehicle.

In some examples, each of the front enclosure rail and the rear enclosure rail respectively includes a first corner rail that mounts to a first rail of the pair of extruded rails, a second corner rail that mounts to a second rail of the pair of extruded rails, and an extruded cross-member extending between the first corner rail and the second corner rail. In those examples, the method includes, before mounting the front enclosure rail and the rear enclosure rail at the pair of extruded rails, trimming the extruded cross-members of the front enclosure rail and the rear enclosure rail to one a first length to adjust a width of the modular battery pack to a first width or a second length that is less than the first length to adjust the width of the modular battery pack to a second width that is less than the first width. In further examples, the extruded cross-members are trimmed to one of the first length or the second length based on a width of a battery receiving portion of a frame structure of the vehicle.

In some implementations, the method includes mounting an extruded cross-member between the pair of extruded rails at a position along the pair of extruded rails that is between the front enclosure rail and the rear enclosure rail. Before mounting the extruded cross-member between the pair of extruded rails, the method includes trimming the extruded cross-member to one of a first length based on a first width of the modular battery pack or a second length that is less than the first length based on a second width of the modular battery pack that is less than the first width. Optionally, the battery module is supported on the extruded cross-member.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 is a sectional view of the extruded rocker attachment rail of the modular battery pack.

FIG. 5 is a sectional view of the extruded enclosure cross-members of the modular battery pack.

FIG. 6 is a sectional view of the extruded corner enclosure rails of the modular battery pack.

Like reference symbols in the various drawings indicate like elements.

DETAILED DESCRIPTION

Figure 1:
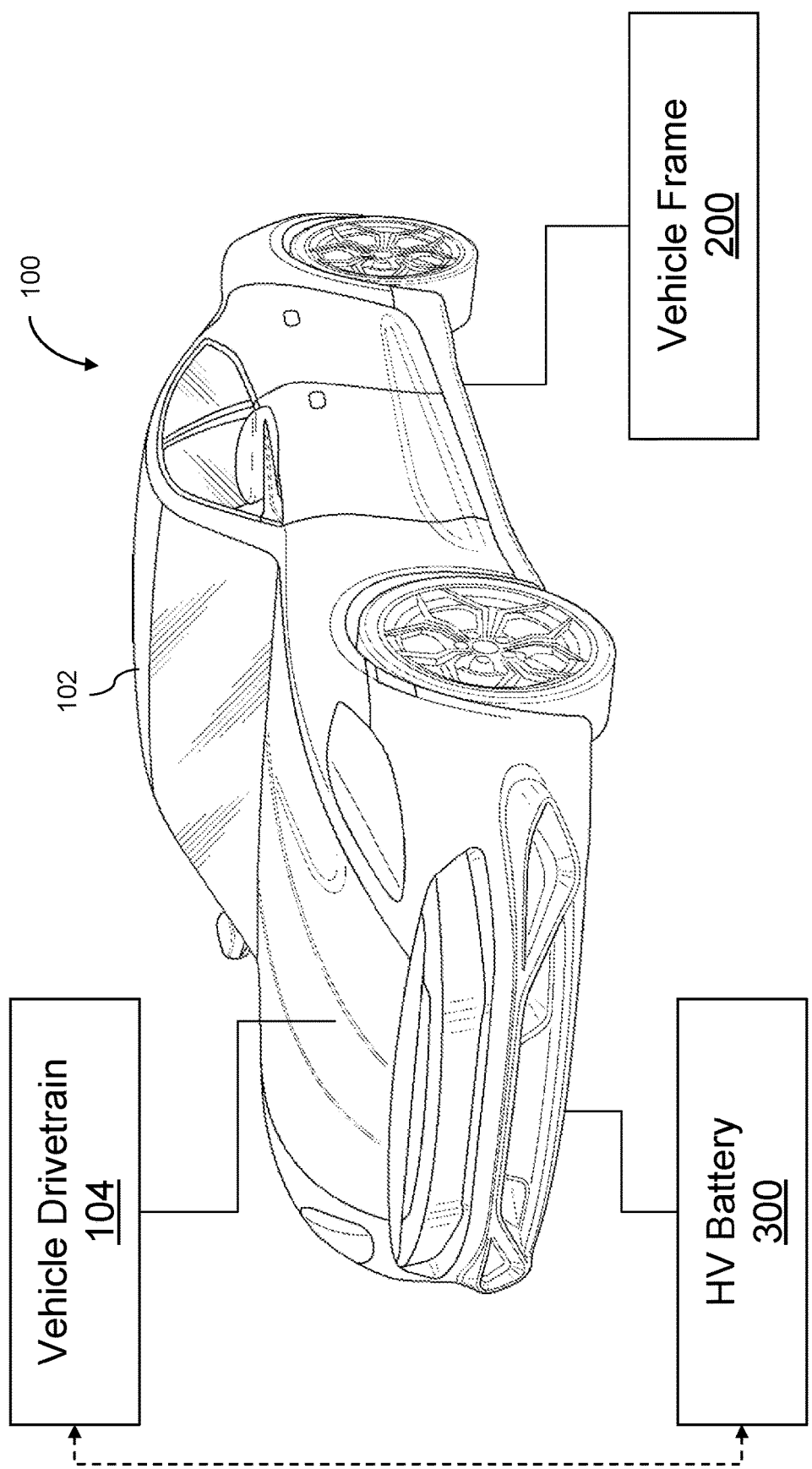
FIG. 1 is a perspective view of a vehicle having a modular battery pack.
Figure 2:
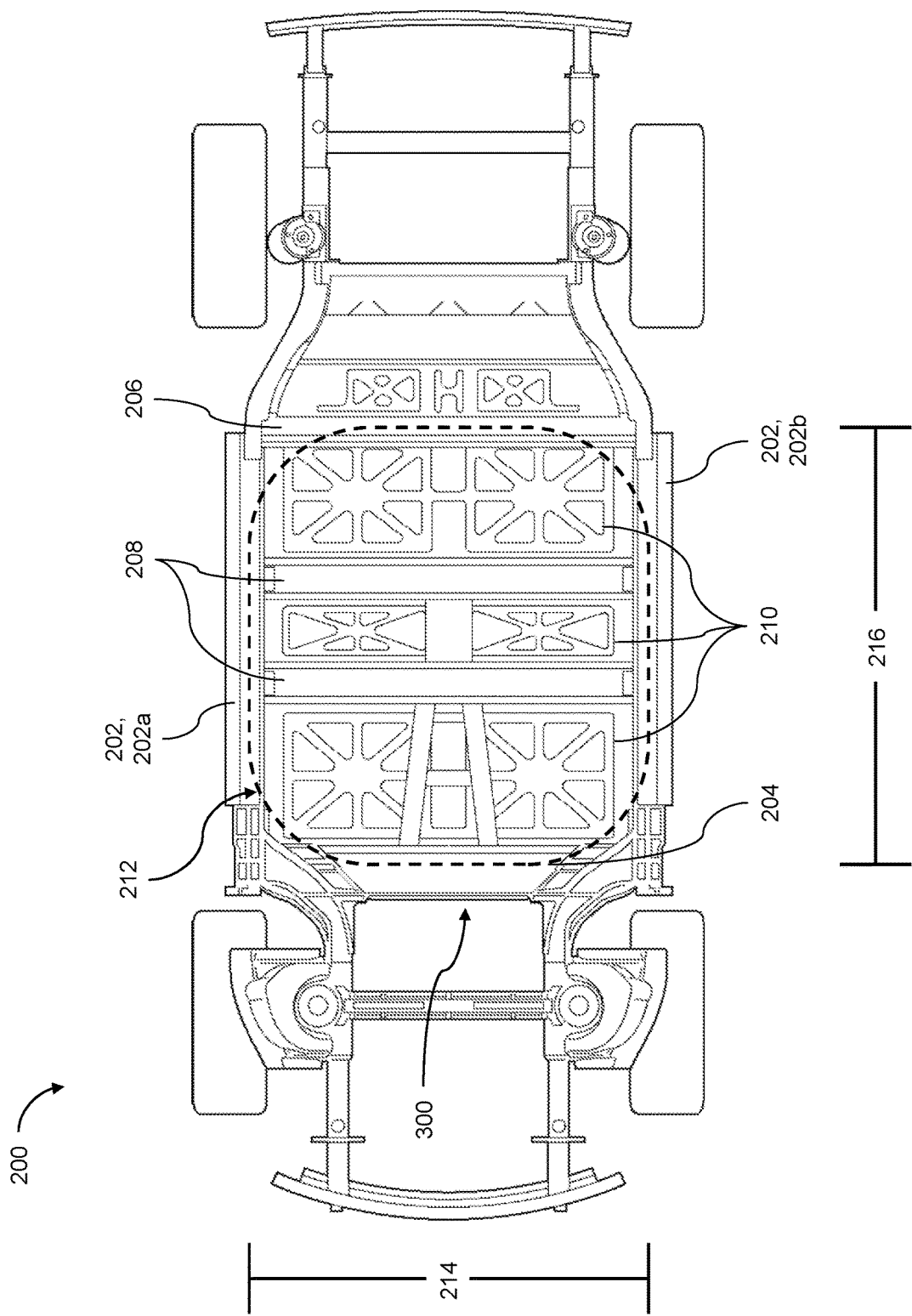
FIG. 2 is a plan view of a frame structure of the vehicle.
Figure 3:
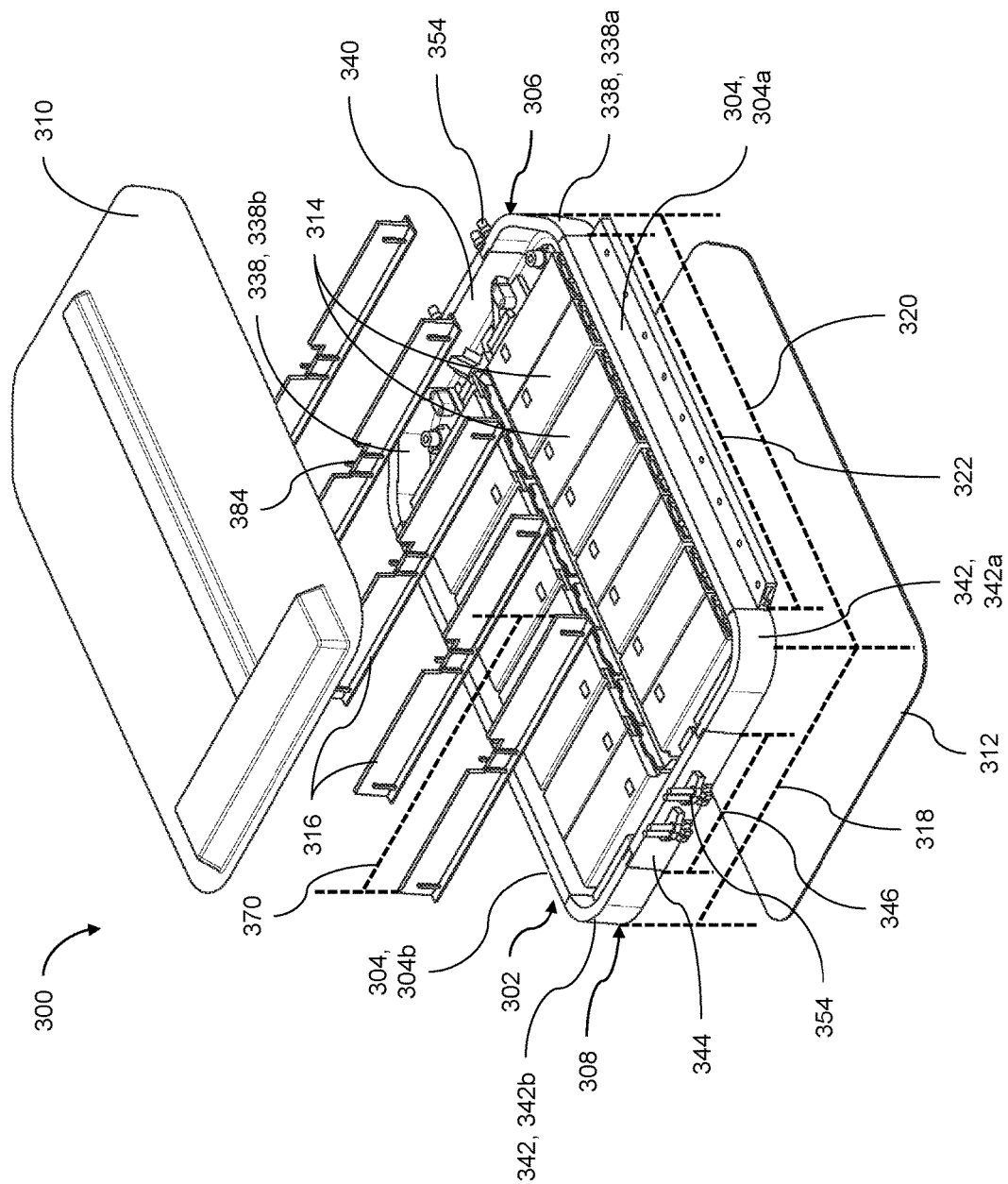
FIG. 3 is an exploded view of the modular battery pack.

Referring to FIGS. 1-3, a vehicle 100, such as a battery-powered electric vehicle or a plug-in hybrid vehicle, includes a vehicle body 102 providing an interior cabin for occupants of the vehicle 100 and that is supported on a vehicle frame structure 200. The frame structure 200 receives and supports a modular battery pack 300 that includes one or more high voltage (HV) battery modules 314 that electrically power a drivetrain 104 of the vehicle 100. As discussed further below, the modular battery pack 300 is configurable or scalable during assembly to adjust dimensions of the modular battery pack 300 based on the dimensions of the frame structure 200 of the vehicle 100 being produced, where the vehicle 100 is one of a variety of different vehicle types and the dimension of the frame structure 200 varies between the different vehicle types.

In other words, vehicles of different segments (e.g., coupes, sedans, sport utility vehicles (SUVs), vans, pickup trucks, delivery vehicles, fleet vehicles, busses, and the like) have frame structures with unique configurations and differing dimensions. For example, the frame structure for a vehicle in one segment and the frame structure for a vehicle in a different segment may have a different width, length, relative position of cross-members, and the like, such as to accommodate different characteristics and dimensions of the vehicle segment (e.g., wheelbase, wheel track, ground clearance, driver and occupant seating positions, size and configuration of cargo areas, and the like). Accordingly, battery packs for vehicles in different segments and product lines often have unique constructions to accommodate the differences between the vehicles. This results in time-consuming and resource-intensive development of individualized battery packs to satisfy the specific requirements for each product line. Manufacturing of these individualized battery packs requires significant tooling investment and higher lead times.

Thus, the modular battery pack 300 includes common or standard components that are scaled during assembly to adjust one or more dimensions of the modular battery pack 300. For example, the modular battery pack 300 is scaled based on corresponding dimensions or mounting positions of the vehicle frame structure 200. As a result, vehicles in a variety of different segments can be produced with the modular battery pack 300, with only minor alterations to the modular battery pack 300 made during assembly to make the modular battery pack 300 suitable for installation at the vehicle of a particular segment. That is, common or standard components are assembled to produce a modular battery pack 300 suitable for installation at one type of vehicle as those assembled to produce a modular battery pack 300 suitable for installation at another type of vehicle, with one or more post-production modifications made to the common or standard components during assembly that result in the assembled battery pack 300 being suitable for installation at the particular vehicle. For example, and as discussed further below, one or more members of the modular battery pack 300 include extruded rails or beams that, during or prior to assembly of the battery pack 300, are trimmed to a desired length to achieve a desired length or width of the battery pack 300 to accommodate the length or width of the vehicle frame structure 200. Other components include stamped plates or sheets that require limited lead time and can be quickly designed and manufactured. Thus, with many other parts associated with the battery pack 300 remaining the same between vehicle segments and product lines, part inventory may be reduced, product development may be accelerated, and assembly may be simplified, which results in lower costs and shorter lead times to support low and high volume manufacturing.

Referring to FIGS. 2 and 3, the modular battery pack 300, when installed at the vehicle 100, is supported on the frame structure 200 and thus is constructed to accommodate dimensions of the frame structure 200. In the illustrated example, the frame structure 200 includes a pair of rocker rails 202, 202a-b that extend along opposing sides of the frame structure 200 between a front frame portion 204 (e.g., a front frame cross-member) and a rear frame portion 206 (e.g., a rear frame cross-member). That is, a first rocker rail 202a and a second rocker rail 202b each extend along a respective side of the frame structure 200 between the front frame cross-member 204 and the rear frame cross-member 206. One or more frame cross-members 208 extend between the first rocker rail 202a and the second rocker rail 202b between the front frame cross-member 204 and the rear frame cross-member 206. Floor panels 210 extend respectively between the first rocker rail 202a, the second rocker rail 202b, and the frame cross-members (e.g., between the front frame cross-member 204 and a respective frame cross-member 208, between adjacent frame cross-members 208, and/or between the rear frame cross-member 206 and a respective frame cross-member 208) to define a floor of the vehicle 100.

Collectively, the pair of rocker rails 202, the front frame cross-member 204, and the rear frame cross-member 206 cooperate to define a battery receiving region or portion 212 of the frame structure 200 that receives and supports the battery pack 300. Dimensions of the battery receiving region 212 constrain the dimensions of the battery pack 300. For example, with the battery pack 300 supported on the frame structure 200 between the first rocker rail 202a and the second rocker rail 202b, a width 214 of the battery receiving region 212 between the first rocker rail 202a and the second rocker rail 202b limits the area that the battery pack 300 may occupy within the battery receiving region 212. Similarly, with the battery pack 300 supported on the frame structure 200 between the front frame cross-member 204 and the rear frame cross-member 206, a length 216 of the battery receiving region 212 between the front frame cross-member 204 and the rear frame cross-member 206 limits the area that the battery pack 300 may occupy within the battery receiving region 212.

With the battery pack 300 mounted to the frame structure 200 at the battery receiving region 212, the floor panels 210 extend along and over the battery pack 300. Thus, the battery pack 300 does not intrude into the vehicle cabin 102 and the battery pack 300 is configured to accommodate different ground clearances between different vehicle segments. The battery pack 300 can be installed at any suitable vehicle frame structure and the frame structure may include characteristics of the frame structures and vehicle platforms described in Ser. No. 18/300,060 filed Apr. 13, 2023, which is hereby incorporated herein by reference in its entirety.

As shown in FIG. 3, the modular battery pack 300 includes a scalable enclosure structure 302 that mounts to the frame structure 200 of the vehicle 100 and that is scalable to adjust one or more dimensions of the modular battery pack 300 to accommodate differences between frame structures 200 of different vehicles 100 (e.g., differently dimensioned battery receiving regions 212).

In the illustrated example, the enclosure structure 302 includes a pair of rocker attachment rails 304, 304a-b that extend between a front enclosure rail 306 and a rear enclosure rail 308 and along opposing sides of the enclosure structure 302. That is, a first rocker attachment rail 304a extends along one side of the enclosure structure 302 between the front enclosure rail 306 and the rear enclosure rail 308 and a second rocker attachment rail 304b extends along the other side of the enclosure structure 302 between the front enclosure rail 306 and the rear enclosure rail 308.

A bottom cover panel 310 mounts to the lower side of the enclosure structure 302 and a top cover panel 312 mounts to the upper side of the enclosure structure 302 to define an interior portion or compartment of the battery pack 300 that accommodates one or more battery modules or battery cells or energy storage devices 314 at the interior portion of the battery pack 300. Thus, the bottom cover panel 310, top cover panel 312, and the enclosure structure 302 may cooperatively seal the interior portion of the battery pack 300 from contaminants and moisture and thus protect the battery modules 314.

The battery pack 300 can include any suitable type of battery module 314 for electrically powering the drivetrain 104 of the vehicle 100, such as lithium-ion batteries, nickel metal hydride batteries, solid state batteries, lithium sulfur batteries, and the like. Optionally, the battery modules 14 are rechargeable, such as via an inverter mechanically coupled to the drivetrain 104 of the vehicle 100.

One or more cross-members or cross-beams 316 extend between the first rocker attachment rail 304a and the second rocker attachment rail 304b within the interior portion of the enclosure structure 302 to provide structural rigidity to the battery pack 300 and to provide mounting structure for the battery modules 314. In some examples, the cross-beams 316 mount to the first rocker attachment rail 304a, the second rocker attachment rail 304b, the top cover panel 310, and/or the bottom cover panel 312.

With the battery pack 300 mounted at the frame structure 200, the first rocker attachment rail 304a mounts to the first rocker rail 202a and the second rocker attachment rail 304b mounts to the second rocker rail 202b. Thus, and as described further below, a width 318 of the battery pack 300 is scaled during assembly to accommodate the width 214 of the battery receiving portion 212 of the frame structure 200.

Further, the front enclosure rail 306 is toward the front frame cross-member 204 and the rear enclosure rail 308 is toward the rear frame cross-member 206. For example, the front enclosure rail 306 is mounted to the front frame cross-member 204 and/or the rear enclosure rail 308 is mounted to the rear frame cross-member 206. Optionally, there is a required spacing or gap between the front enclosure rail 306 and the front frame cross-member 204 and/or between the rear enclosure rail 308 and the rear frame cross-member 206, such as to accommodate electrical connection between the battery pack 300 and the drivetrain 104 of the vehicle 100. Thus, and as described further below, a length 320 of the battery pack 300 is scaled during assembly to accommodate the length 216 of the battery receiving portion 212 of the frame structure 200.

In reference to FIGS. 3 and 4, the first rocker attachment rail 304a and the second rocker attachment rail 304b are each an extruded rail (e.g., an extruded aluminum rail) formed from a common die to have a substantially consistent or continuous cross-section (e.g., FIG. 4) along a length 322 of the respective rail 304. In the illustrated example, the first rocker attachment rail 304a and the second rocker attachment rail 304b are identical such that they may be used interchangeably in assembling the enclosure structure 302. Because the rocker attachment rails 304 are extruded elements, they can be manufactured to an initial or first length and then trimmed to a desired or second length based on a desired length 320 of the battery pack 300. For example, the length 322 of the extruded rocker attachment rails 304 is trimmed to a first length to adjust the length 320 of the battery pack 300 to a first length, or the length 322 of the extruded rocker attachment rails 304 is trimmed to a second length that is less than the first length to adjust the length 320 of the battery pack 300 to a second length that is less than the first length of the battery pack 300. Thus, the length 322 of the rocker attachment rail 304 is scalable to adjust the length 320 of the battery pack 300.

Each rocker attachment rail 304 includes a first side or inner side 324 that faces the interior compartment of the battery pack 300. A flange 326 extends from the interior side 324 of the rocker attachment rail 304 and the bottom panel 312 and/or the one or more cross-beams 316 mount to the rocker attachment rail 304 at the flange 326. A second side or outer side 328 of the rocker attachment rail 304 is opposite the interior side 324 and faces exterior of the battery pack 300. A rocker attachment portion 330 extends from the outer side 328 of the rocker attachment rail 304 and is configured to mount the enclosure structure 302 to the rocker rails 202 of the frame structure 200. For example, one or more through holes 332 are formed through the rocker attachment portion 330 and configured to receive respective fasteners (e.g., bolts or rivets or other suitable fasteners) for mounting the battery pack 300 at the frame structure 200.

Further, a third side or top side 334 of the rocker attachment rail 304 extends between the first side 324 and the second side 328. The top cover panel 310 mounts to the rocker attachment rail 304 at the top side 334. A fourth side or bottom side 336 is opposite the top side 334 and extends between the first side 324 and the second side 328. The bottom cover panel 312 mounts to the rocker attachment rail 304 at the bottom side 336, such as at the flange 326 extending from the first side 324 and along the bottom side 336.

With the rocker attachment rails 304 mounted to the respective rocker rails 202 of the frame structure 200 and extending substantially parallel to one another, the width 318 of the battery pack 300 is scalable by adjusting respective lengths of the front enclosure rail 306 and the rear enclosure rail 308 that extend between the first rocker attachment rail 304a and the second rocker attachment rail 304b.

As shown in FIG. 3, the front enclosure rail 306 includes a pair of front corner rails 338, 338a-b and a front enclosure cross-member 340 that extends between the front corner rails 338. A first front corner rail 338a is coupled to the first rocker attachment rail 304a and a second front corner rail 338b is coupled to the second rocker attachment rail 304b. The front enclosure cross-member 340 extends between the first front corner rail 338a and the second front corner rail 338b.

Similarly, the rear enclosure rail 308 includes a pair of rear corner rails 342, 342a-b and a rear enclosure cross-member 344 that extends between the rear corner rails 342. A first rear corner rail 342a is coupled to the first rocker attachment rail 304a at an opposite end of the first rocker attachment rail 304a from the first front corner rail 338a, and a second rear corner rail 342b is coupled to the second rocker attachment rail 304b at an opposite end of the second rocker attachment rail 304b from the second front corner rail 338b. The rear enclosure cross-member 344 extends between the first rear corner rail 342a and the second rear corner rail 342b.

In reference to FIGS. 3, 5, and 6, the front enclosure cross-member 340, the rear enclosure cross-member 344, the front corner rails 338, and the rear corner rails 342 are each an extruded rail (e.g., an extruded aluminum rail) respectively having substantially consistent or continuous cross-sections. In the illustrated example, the front enclosure cross-member 340 and the rear enclosure cross-member 344 are identical, such that they are formed from a common die and have the same cross-section (e.g., FIG. 5) along a length 346 of the respective rail 340, 344. Thus, the front enclosure cross-member 340 and the rear enclosure cross-member 344 may be used interchangeably in assembling the enclosure structure 302.

Because the front enclosure cross-member 340 and the rear enclosure cross-member 344 are extruded elements, they can be manufactured to an initial or first length and then trimmed to a desired or second length based on a desired width 318 of the battery pack 300. For example, the length 346 of the front enclosure cross-member 340 and the rear enclosure cross-member 344 is trimmed to a first length to adjust the width 318 of the battery pack 300 to a first width, or the length 346 of the front enclosure cross-member 340 and the rear enclosure cross-member 344 is trimmed to a second length that is less than the first length to adjust the width 318 of the battery pack 300 to a second width that is less than the first width of the battery pack 300. Thus, the length 346 of the front enclosure cross-member 340 and the rear enclosure cross-member 344 is scalable to adjust the width 318 of the battery pack 300. Optionally, the front enclosure cross-member 340 and the rear enclosure cross-member 344 are scaled to different lengths based on the configuration of the battery pack 300.

The front enclosure cross-member 340 and the rear enclosure cross-member 344 each include a first side or inner side 348 that faces the interior compartment of the battery pack 300. A flange 350 extends from the inner side 348 and the bottom panel 312 mounts to the respective front enclosure cross-member 340 and the rear enclosure cross-member 344 at the flange 350. A second side or outer side 352 is opposite the inner side 348 and faces exterior of the battery pack 300. As shown in FIG. 3, one or more electrical connectors or receivers 354 (such as a wire, a plug, a socket, a terminal, and the like) is coupled to the outer side 352 and electrically connects to the battery modules 314 and/or other electrical components within the battery pack 300 to electrically connect the battery pack 300 to the drivetrain 104 of the vehicle 100.

Moreover, a third side or top side 356 of the front enclosure cross-member 340 and the rear enclosure cross-member 344 extends between the inner side 348 and the outer side 352. The top cover panel 310 mounts to the front enclosure cross-member 340 and the rear enclosure cross-member 344 at the respective top sides 356. A fourth side or bottom side 358 is opposite the top side 356 and extends between the inner side 348 and the outer side 352. The bottom cover panel 312 mounts to the front enclosure cross-member 340 and the rear enclosure cross-member 344 at the respective bottom sides 358, such as at the flange 350 extending from the inner side 348 and along the bottom side 358.

The front corner rails 338 and the rear corner rails 342 are extruded rails that, after being formed, are bent to a desired configuration. For example, the front corner rails 338 include two discrete bends between attaching ends of the front corner rails 338 that respectively couple to the rocker attachment rails 304 and the front enclosure cross-member 340. The rear corner rails 342 include one bend between attaching ends of the rear corner rails 342 that respectively couple to the rocker attachment rails 304 and the rear enclosure cross-member 344. Optionally, the front corner rails 338 and the rear corner rails 342 have the same bend or configuration. Because it is simpler and more cost-effective to form shorter extruded members, the front corner rails 338 and the rear corner rails 342 are kept standard and the front enclosure cross-member 340 and the rear enclosure cross-member 344 are scaled to adjust the width 318 of the battery pack 300.

In the illustrated example, the front corner rails 338 and the rear corner rails 342 are extruded elements formed from a common die and thus have shared cross-section (e.g., FIG. 6) along respective lengths of the front corner rails 338 and rear corner rails 342. Optionally, the front corner rails 338 and the rear corner rails 342 are trimmed after forming to a desired length. After forming (and optional trimming), the front corner rails 338 and the rear corner rails 342 are bent to their respective configurations.

Each front corner rail 338 and each rear corner rail 342 includes a first side or inner side 360 that faces the interior compartment of the battery pack 300. A flange 362 extends from the inner side 360 and the bottom panel 312 mounts to the front corner rails 338 and the rear corner rails 342 at the respective flanges 362. A second or outer side 364 is opposite the inner side 360 and faces exterior of the battery pack 300. A third side or top side 366 of the front corner rails 338 and the rear corner rails 342 extends between the inner side 360 and the outer side 364. The top cover panel 310 mounts to the front corner rails 338 and the rear corner rails 342 at the respective top sides 366. A fourth side or bottom side 368 is opposite the top side 366 and extends between the inner side 360 and the outer side 364. The bottom cover panel 312 mounts to the front corner rail 338 and the rear corner rail 342 at the respective bottom sides 368, such as at the flange 362 extending from the inner side 360 and along the bottom side 368.

Figure 7:
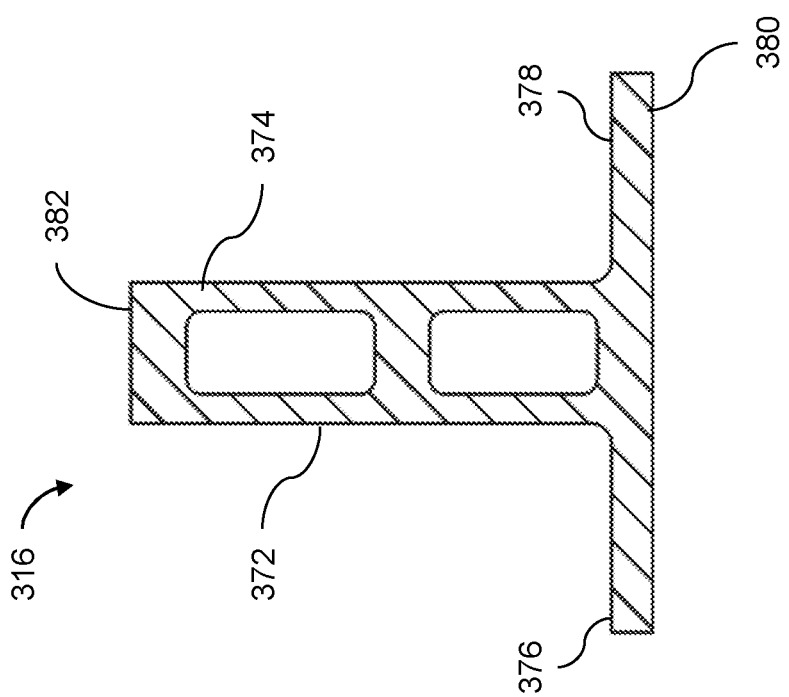
FIG. 7 is a sectional view of the extruded interior cross-members of the modular battery pack.

Referring to FIGS. 3 and 7, each interior cross-member or cross-beam 316 that mounts between the first rocker attachment rail 304a and the second rocker attachment rail 304b is an extruded rail (e.g., an extruded aluminum rail) formed from a common die to have a substantially consistent or continuous cross-section (e.g., FIG. 7) along a length 370 of the respective cross-beam 316. Because the cross-beams 316 are extruded elements, they can be manufactured to an initial or first length and then trimmed to a desired or second length based on the width 318 of the battery pack 300. Thus, the length 370 of the cross-beams 316 is scalable based on the width 318 of the battery pack 300.

The one or more cross-beams 316 are positioned at any suitable position along the rocker attachment rails 304 between the front enclosure rail 306 and the rear enclosure rail 308, such as based on the layout and/or number of battery modules 314 within the battery pack 300.

Each cross-beam 316 includes a first side 372 and a second side 374 that is opposite the first side 372. A first flange 376 extends from the first side 372 and along a third side or bottom side 380 of the cross-beam 316 and a second flange 378 extends from the second side 374 and along the bottom side 380. Each of the first flange 376 and the second flange 378 supports a respective battery module 314 within the battery pack 300. Optionally, battery modules 314 are sandwiched between adjacent cross-beams 316 such that each battery module 314 is supported on one side by a respective first flange 376 and on another side by a respective second flange 378 of the adjacent cross-beams 316. The bottom cover panel 312 couples to the cross-beams 316 at the respective bottom sides 380. A fourth side or top side 382 of the cross-beam 316 is opposite the bottom side 380 and the top cover panel 310 couples to the top side 382. A recess or passageway 384 may be formed through the respective cross-beams 316, such as to allow wiring or other structure to pass along the length 320 of the battery pack 300.

Each of the top cover panel 310 and the bottom cover panel 312 are stamped panels (e.g., stamped aluminum or stamped carbon steel). Thus, the top cover panel 310 and the bottom cover panel 312 are stamped based on the size and/or shape of the battery pack 300.

Thus, the HV battery pack 300 provides a modular battery platform for use across different vehicles with part commonality as the enclosure structure 302 is scalable to accommodate different vehicle sizes (e.g., different sizes of a battery receiving region 212 of the vehicle frame structure 200). The modular enclosure structure 302 includes mechanical structural components formed via extrusion (e.g., aluminum extrusion) and sheet metal (e.g., aluminum, steel, and/or carbon steel), using different joineries. The construction of the battery enclosure 302 optimizes development time and costs and reduces weight. The battery pack 300 satisfies battery pack layout, battery cooling, vehicle regulations (e.g., crash test requirements), and vehicle packaging. For example, the modular battery pack 300 satisfies European and United States five star crash test safety ratings when used in combination with a side crash system of the vehicle 100.

The modular battery enclosure 302 includes four or more extrusion members covering overall length 320 and width 318 of the battery pack 300, and the battery enclosure 302 includes cross-members 316 inside the battery pack 300 and sandwiched between battery modules 314 to support mounting of the modules 314 and to provide cross-vehicle stiffness to the battery pack 300. The height of the battery enclosure 302 (e.g., a height of the respective rocker attachment rails 304, the front enclosure rail 306, and the rear enclosure rail 308, with the top cover panel 310 and the bottom cover panel 312 inset into the enclosure structure 302 or protruding relatively slightly from the enclosure structure 302) allows the battery pack 300 to be used with vehicles across any suitable vehicle segment, including those with different ranges of ground clearance and rocker width.

Further, the weight of the battery pack 300 is optimized with the use of aluminum extruded and stamped parts. The modular battery pack 300 supports improved vehicle development timing and reduced resource and tooling costs, and advanced electric vehicle architecture with a flat floor battery layout that positions the battery pack 300 beneath the floor panels 210 of the frame structure 200. The battery pack 300 has a lower bill of materials cost due to the commonality of parts in the assembly, resulting in a lower investment on manufacturing and processing.

Figure 8:
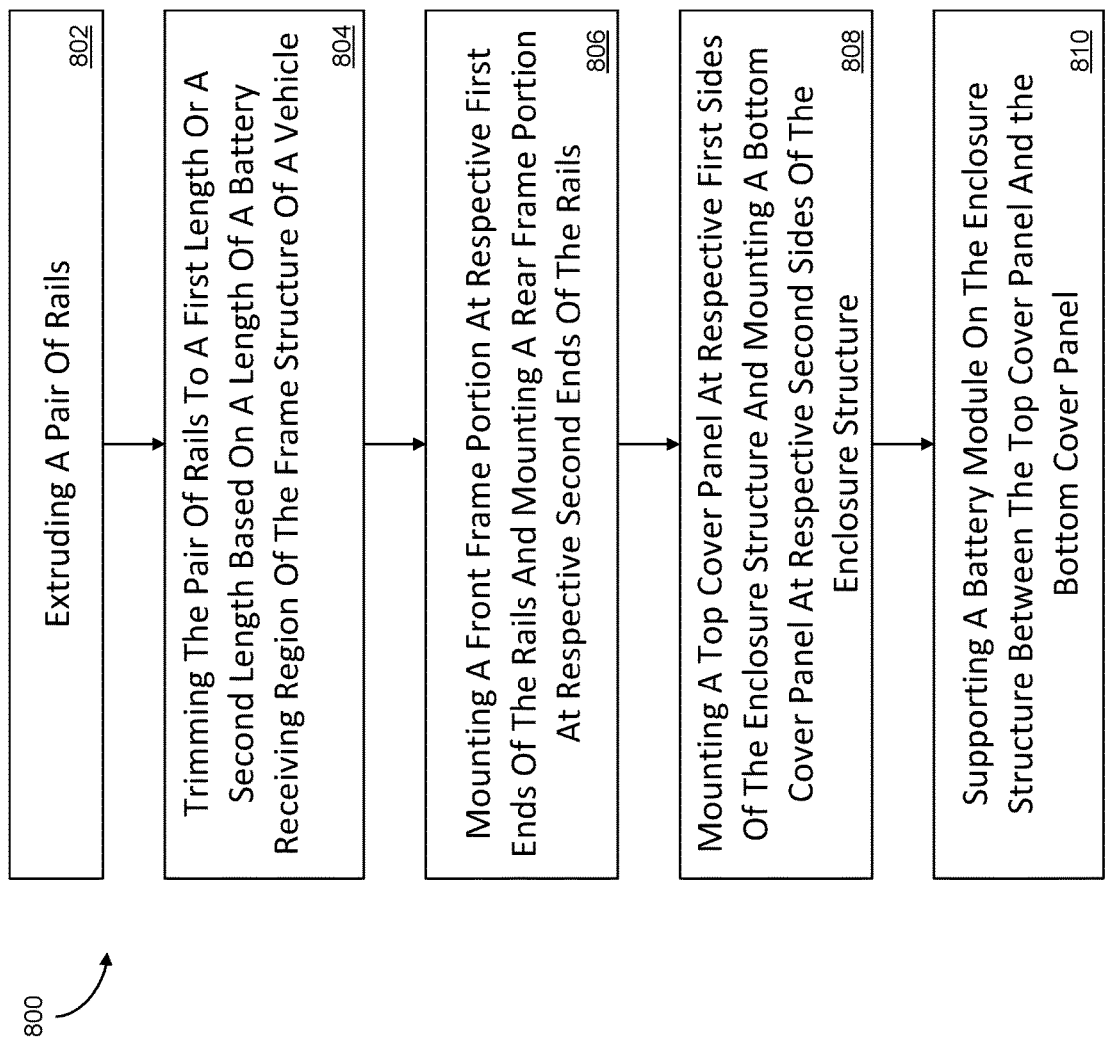
FIG. 8 is a flowchart of an exemplary arrangement of operations for a method of manufacturing the modular battery pack.

FIG. 8 provides a flowchart of an exemplary arrangement of operations for a method 800 of manufacturing the modular battery pack 300 for the vehicle 100. At operation 802, the method 800 includes extruding a pair of rocker attachment rails 304. At operation 804, the method 800 includes trimming the pair of rocker attachment rails 304 to a first length or to a second length based on a desired length 320 of the battery pack 300 (such as based on a length 216 of a battery receiving portion 212 of the frame structure 200 of the vehicle 100 at which the battery pack 300 is mounted). The method 800, at operation 806, includes mounting the front enclosure rail 306 at respective first ends of the pair of rocker attachment rails 304 and mounting the rear enclosure rail 308 at respective second ends of the pair of rocker attachment rails 304 opposite the first ends. At operation 808, the method 800 includes mounting the top cover panel 310 at respective first sides of the enclosure structure 302 (e.g., the first sides of the rocker attachment rails 304, the front enclosure rail 306, the rear enclosure rail 308, and/or the cross-beams 316) and mounting the bottom cover panel 312 at respective second sides of the enclosure structure 302 (e.g., the second sides of the rocker attachment rails 304, the front enclosure rail 306, the rear enclosure rail 308, and/or the cross-beams 316). At operation 810, the method includes supporting one or more battery modules 314 on the enclosure structure 302 (such as on the one or more cross-beams 316).

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

A number of implementations have been described. Nevertheless, it will be understood that various modifications may be made without departing from the spirit and scope of the disclosure. Accordingly, other implementations are within the scope of the following claims.

What is claimed is:

1. A modular battery pack for a vehicle, the modular battery pack comprising:
   a scalable enclosure structure, the enclosure structure comprising:
      a front enclosure rail;
      a rear enclosure rail; and
      a pair of rocker attachment rails extending between the front enclosure rail and the rear enclosure rail along opposing sides of the enclosure structure, wherein each rail in the pair of rocker attachment rails comprises a length that is scalable to adjust a length of the modular battery pack;
   a bottom cover panel coupled to respective first sides of the front enclosure rail, the rear enclosure rail, and each rail of the pair of rocker attachment rails;
   a top cover panel coupled to respective second sides of the front enclosure rail, the rear enclosure rail, and each rail of the pair of rocker attachment rails, wherein the respective second sides of the front enclosure rail, the rear enclosure rail, and each rail of the pair of rocker attachment rails are opposite the respective first sides; and
   a battery module supported on the scalable enclosure structure between the bottom cover panel and the top cover panel.

2. The modular battery pack of claim 1, wherein:
   each rail of the pair of rocker attachment rails comprises an extruded rail; and
   the extruded rail is trimmed to one of:
      a first length to adjust the length of the modular battery pack to a first length; or
      a second length that is less than the first length to adjust the length of the modular battery pack to a second length that is less than the first length of the modular battery pack.

3. The modular battery pack of claim 1, wherein the length of the pair of rocker attachment rails is scaled to adjust the length of the modular battery pack based on a length of a battery receiving portion of a frame structure of the vehicle.

4. The modular battery pack of claim 1, wherein the front enclosure rail and the rear enclosure rail are scalable to adjust a width of the modular battery pack.

5. The modular battery pack of claim 4, wherein each of the front enclosure rail and the rear enclosure rail respectively comprises:
   a first corner rail coupled to a first rail of the pair of rocker attachment rails;
   a second corner rail coupled to a second rail of the pair of rocker attachment rails; and
   a cross-member extending between the first corner rail and the second corner rail, wherein a length of the cross-member is scalable to adjust the width of the modular battery pack.

6. The modular battery pack of claim 5, wherein:
   the cross-member comprises an extruded rail; and
   the extruded rail is trimmed to one of:
      a first length to adjust the width of the modular battery pack to a first width; or
      a second length that is less than the first length to adjust the width of the modular battery pack to a second width that is less than the first width.

7. The modular battery pack of claim 5, wherein:
   each of the first corner rail and the second corner rail of the front enclosure rail comprises an extruded front corner rail formed from a common die; and
   each of the first corner rail and the second corner rail of the rear enclosure rail comprises an extruded rear corner rail formed from a common die.

8. The modular battery pack of claim 7, wherein each of the first corner rail and the second corner rail of the front enclosure rail and the first corner rail and the second corner rail of the rear enclosure rail comprises an extruded corner rail formed from a common die.

9. The modular battery pack of claim 4, wherein a length of the front enclosure rail and the rear enclosure rail is scaled to adjust the width of the modular battery pack based on a width of a battery receiving portion of a frame structure of the vehicle.

10. The modular battery pack of claim 1, wherein:
    the scalable enclosure structure comprises a cross-member that extends between the pair of rocker attachment rails at a position along the pair of rocker attachment rails that is between the front enclosure rail and the rear enclosure rail; and
    the battery module is supported on the cross-member.

11. The modular battery pack of claim 1, wherein:
    the scalable enclosure structure comprises a plurality of cross-members that respectively extend between the pair of rocker attachment rails at discrete positions along the pair of rocker attachment rails between the front enclosure rail and the rear enclosure rail; and
    the battery module is supported between adjacent cross-members of the plurality of cross-members.

12. The modular battery pack of claim 1, wherein the pair of rocker attachment rails, when the modular battery pack is supported on a frame structure of a vehicle, respectively mount to corresponding rocker rails extending along opposing sides of the frame structure of the vehicle.

13. The modular battery pack of claim 1, wherein the battery module, when the modular battery pack is equipped at the vehicle, is operable to electrically power a drivetrain of the vehicle.

14. A vehicle comprising:
    a frame structure comprising a pair of rocker rails extending along opposing sides of the frame structure; and
    a modular battery pack supported on the frame structure and that is operable to electrically power a drivetrain of the vehicle, the modular battery pack comprising:
       a scalable enclosure structure, the enclosure structure comprising:
          a front enclosure rail;
          a rear enclosure rail; and
          a pair of rocker attachment rails extending between the front enclosure rail and the rear enclosure rail along opposing sides of the enclosure structure, wherein each rail in the pair of rocker attachment rails comprises a length that is scalable to adjust a length of the modular battery pack;
       a bottom cover panel coupled to respective first sides of the front enclosure rail, the rear enclosure rail, and each rail of the pair of rocker attachment rails;
       a top cover panel coupled to respective second sides of the front enclosure rail, the rear enclosure rail, and each rail of the pair of rocker attachment rails, wherein the respective second sides of the front enclosure rail, the rear enclosure rail, and each rail of the pair of rocker attachment rails are opposite the respective first sides; and
a battery module supported on the scalable enclosure structure between the bottom cover panel and the top cover panel.

15. The vehicle of claim 14, wherein:
each rail of the pair of rocker attachment rails comprises an extruded rail; and
the extruded rail is trimmed to one of:
a first length to adjust the length of the modular battery pack to a first length; or
a second length that is less than the first length to adjust the length of the modular battery pack to a second length that is less than the first length of the modular battery pack.

16. The vehicle of claim 14, wherein the length of the pair of rocker attachment rails is scaled to adjust the length of the modular battery pack based on a length of a battery receiving portion of the frame structure of the vehicle.

17. The vehicle of claim 14, wherein the front enclosure rail and the rear enclosure rail are scalable to adjust a width of the modular battery pack.

18. The vehicle of claim 17, wherein each of the front enclosure rail and the rear enclosure rail respectively comprises:
a first corner rail coupled to a first rail of the pair of rocker attachment rails;
a second corner rail coupled to a second rail of the pair of rocker attachment rails; and
a cross-member extending between the first corner rail and the second corner rail, wherein a length of the cross-member is scalable to adjust the width of the modular battery pack.

19. The vehicle of claim 18, wherein:
the cross-member comprises an extruded rail; and
the extruded rail is trimmed to one of:
a first length to adjust the width of the modular battery pack to a first width; or
a second length that is less than the first length to adjust the width of the modular battery pack to a second width that is less than the first width.

20. The vehicle of claim 18, wherein:
each of the first corner rail and the second corner rail of the front enclosure rail comprises an extruded front corner rail formed from a common die; and
each of the first corner rail and the second corner rail of the rear enclosure rail comprises an extruded rear corner rail formed from a common die.

21. The vehicle of claim 20, wherein each of the first corner rail and the second corner rail of the front enclosure rail and the first corner rail and the second corner rail of the rear enclosure rail comprises an extruded corner rail formed from a common die.

22. The vehicle of claim 17, wherein a length of the front enclosure rail and the rear enclosure rail is scaled to adjust the width of the modular battery pack based on a width of a battery receiving portion of the frame structure of the vehicle.

23. The vehicle of claim 14, wherein:
the scalable enclosure structure comprises a cross-member that extends between the pair of rocker attachment rails at a position along the pair of rocker attachment rails that is between the front enclosure rail and the rear enclosure rail; and
the battery module is supported on the cross-member.

24. The vehicle of claim 14, wherein:
the scalable enclosure structure comprises a plurality of cross-members that respectively extend between the pair of rocker attachment rails at discrete positions along the pair of rocker attachment rails between the front enclosure rail and the rear enclosure rail; and
the battery module is supported between adjacent cross-members of the plurality of cross-members.

25. The vehicle of claim 14, wherein the pair of rocker attachment rails respectively mount to corresponding rocker rails extending along opposing sides of the frame structure of the vehicle.

26. A method for manufacturing a modular battery pack for a vehicle, the method comprising:
assembling a scalable enclosure structure, wherein assembling the scalable enclosure structure comprises:
mounting a front enclosure rail at respective first ends of a pair of extruded rails;
mounting a rear enclosure rail at respective second ends of the pair of extruded rails, the respective second ends opposite the respective first ends;
before mounting the front enclosure rail and the rear enclosure rail at the pair of extruded rails, trimming the pair of extruded rails to one of:
a first length to provide a first length of the modular battery pack; or
a second length that is less than the first length to provide a second length of the modular battery pack that is less than the first length of the modular battery pack;
mounting a bottom cover panel to respective first sides of the front enclosure rail, the rear enclosure rail, and each rail of the pair of extruded rails; and
mounting a top cover panel to respective second sides of the front enclosure rail, the rear enclosure rail, and each rail of the pair of extruded rails, wherein the respective second sides of the front enclosure rail, the rear enclosure rail, and each rail of the pair of extruded rail are opposite the respective first sides; and
supporting a battery module on the scalable enclosure structure between the bottom cover panel and the top cover panel.

27. The method of claim 26, wherein the pair of extruded rails are trimmed to one of the first length or the second length based on a length of a battery receiving portion of a frame structure of the vehicle.

28. The method of claim 26, wherein:
each of the front enclosure rail and the rear enclosure rail respectively comprises:
a first corner rail that mounts to a first rail of the pair of extruded rails;
a second corner rail that mounts to a second rail of the pair of extruded rails; and
an extruded cross-member extending between the first corner rail and the second corner rail; and
the method comprises, before mounting the front enclosure rail and the rear enclosure rail at the pair of extruded rails, trimming the extruded cross-members of the front enclosure rail and the rear enclosure rail to one of:
a first length to adjust a width of the modular battery pack to a first width; or
a second length that is less than the first length to adjust the width of the modular battery pack to a second width that is less than the first width.

29. The method of claim 28, wherein the extruded cross-members are trimmed to one of the first length or the second length based on a width of a battery receiving portion of a frame structure of the vehicle.

30. The method of claim 26, wherein:
assembling the scalable frame structure comprises:
mounting an extruded cross-member between the pair of extruded rails at a position along the pair of extruded rails that is between the front enclosure rail and the rear enclosure rail; and
before mounting the extruded cross-member between the pair of extruded rails, trimming the extruded cross-member to one of:
a first length based on a first width of the modular battery pack; or
a second length that is less than the first length based on a second width of the modular battery pack that is less than the first width.

31. The method of claim 30, wherein the battery module is supported on the extruded cross-member.

* * * * *